(12) United States Patent
Maget

(10) Patent No.: US 6,321,561 B1
(45) Date of Patent: Nov. 27, 2001

(54) ELECTROCHEMICAL REFRIGERATION SYSTEM AND METHOD

(76) Inventor: Henri J. R. Maget, 2661 Palomino Cir., La Jolla, CA (US) 92037

(*) Notice: Subject to any disclaimer, the term of this patent is extended or adjusted under 35 U.S.C. 154(b) by 0 days.

(21) Appl. No.: 09/410,774

(22) Filed: Oct. 1, 1999

(51) Int. Cl.[7] .............................. F04B 17/00; F25B 1/00
(52) U.S. Cl. .............................. 62/498; 417/48; 417/379
(58) Field of Search .................. 62/498, 115; 417/48, 417/379

(56) References Cited

U.S. PATENT DOCUMENTS

| | | | |
|---|---|---|---|
| 3,739,573 | 6/1973 | Giner | 417/394 |
| 4,402,817 | 9/1983 | Maget | 204/301 |
| 4,522,698 | 6/1985 | Maget | 204/301 |
| 4,593,534 * | 6/1986 | Bloomfield | 417/48 |
| 4,648,955 | 3/1987 | Maget | 204/258 |
| 4,671,080 | 6/1987 | Gross | 62/467 |
| 4,687,423 | 8/1987 | Maget et al. | 417/379 |
| 4,829,785 | 5/1989 | Hersey | 62/467 |
| 5,038,821 | 8/1991 | Maget | 137/486 |
| 5,149,413 | 9/1992 | Maget | 429/48 |
| 5,671,905 | 9/1997 | Hopkins, Jr. | 251/129.01 |
| 6,010,317 * | 1/2000 | Maget et al. | 417/379 |

FOREIGN PATENT DOCUMENTS 756149    8/1956    (GB).

OTHER PUBLICATIONS

Sediak et al., "Hydrogen Recovery and Purification using the Solid Polymer Electrolyte Electrolysis Cell", *Int. J. Hydrogen Energy*, vol. 6, pp. 45–51, May 1980.

Maget H., "Electrochemical Prime Movers", 24th IECEC, Washington, D.C., Aug. 1989, vol. 3, pp 1613–1618.

Maget H., Proceedings of the 5th Annual Battery Conference on Applications and Advances, Long Beach, CA, Jan. 1990, "Electrochemical Prime Movers, Converters of DC Electric Energy to Mechanical Work".

Rohland et al., "Electrochemical Hydrogen Compressor", *Electrochimica Acta*., vol. 43, No. 24, pp. 3841–3846, 1998.

Maget H., "Electrochemical Pumps offsprings of SPE Fuel Cell Technology", Proceedings of the Symposium on Fuel Cells, San Francisco, CA No. 1989, vol. 89–14, pp 94–15.

* cited by examiner

*Primary Examiner*—William Wayner
(74) *Attorney, Agent, or Firm*—Brown, Martin, Haller & McClain, LLP

(57) ABSTRACT

A refrigeration system has a compressor, a condenser, and an evaporator connected in a loop to provide a refrigeration cycle designed for small heat loads of less than one kilowatt. The compressor has a first refrigerant compressor section connected in the loop for receiving low pressure refrigerant fluid from the evaporator and providing compressed refrigerant fluid to the condenser. A second, electrochemical gas compressor section has a gas output linked to the first compressor section for compressing the refrigerant fluid.

11 Claims, 2 Drawing Sheets

ELECTROCHEMICAL REFRIGERATION SYSTEM AND METHOD

BACKGROUND OF THE INVENTION

The present invention relates generally to refrigeration systems and methods, and is particularly concerned with an electrochemical refrigeration system and method for use in removing relatively small heat loads.

A conventional refrigeration system uses a mechanical compressor of the piston or rotary type to compress a refrigeration gas or vapor, which is subsequently expanded, and sometimes vaporized, utilizing energy available at low temperatures, and thereby cooling or maintaining an area such as a refrigeration chamber, a surface, or a fluid, at a low temperature. Thus, in a basic refrigeration cycle, refrigerant is compressed in a mechanical compressor. The compressed vapor is then liquefied in a condenser. Liquid refrigerant flows from the condenser to an expansion valve where its pressure and temperature are reduced, and then to an evaporator where heat is absorbed from the region or fluid being cooled and the refrigerant boils. The liquid refrigerant is thus evaporated and then returned to the compressor to repeat the refrigeration cycle.

There are a number of problems with conventional mechanical refrigeration systems. One is that mechanical compressors typically require considerable maintenance to ensure adequate lubrication, to replace seals, and so on. Furthermore, the efficiency of mechanical compressors is considerably reduced when the compressor size is decreased to process small heat loads, generally below the power levels of small domestic refrigerators from the "white goods" industry, i.e. rated generally at the ton level, which is equivalent to a heat load of 3.5 kilowatts. Because of the unsuitability of mechanical compressors for handling small heat loads, microrefrigerators for heat loads of 50–100 watts, or less than 1 kilowatt, are not available. Thus, other means must be used for cooling when small heat loads are involved, such as fans, metal plates with fins as heat sinks. and the like, and these are often subject to other disadvantages. Up to now, no refrigeration system has been devised which is suitable for handling small heat loads of less than 1 kilowatt.

In my previous U.S. Pat. Nos. 3,489,670, 4,118,299, 4,402,817, 4,522,698, 4,648,955, 5,038,821, 5,149,413, 5,334,304, and 5,417,822, and in the following publications: Maget H., Proceedings of the $5^{th}$ Annual Battery Conference on Applications and Advances, Long Beach, Calif., Jan. 1990 "Electrochemical Prime Movers, Converters of DC Electric Energy to Mechanical Work"; Maget H., "Electrochemical Prime Movers", $24^{th}$ IECEC, Washington, D.C. Aug. 1989, Vol. 3, pp 1613–1618; and Maget H., Proceedings of the Symposium on Fuel Cells, San Francisco, Calif. No. 1989, Vol 89–14, pp 94–105 "Electrochemical Pumps Offsprings of SPE Fuel Cell Technology", I have described various low pressure actuators used for pumping fluids in various applications, and means for operation and control of such actuators.

SUMMARY OF THE INVENTION

It is an object of the present invention to provide a new and improved refrigeration system and method.

According to one aspect of the present invention, a refrigeration system is provided which comprises an evaporator having an input for fluid refrigerant and an output for expanded refrigerant, and adapted for removing heat from a heat load of less than one kilowatt, a compressor having a refrigerant input connected to the evaporator output and a refrigerant output for compressed refrigerant fluid, and a condenser for condensing the compressed refrigerant, the condenser having an input connected to the compressor refrigerant output and an output linked to the evaporator input, the compressor having a first refrigerant compressor section for providing compressed refrigerant fluid at the refrigerant output, and a second electrochemical gas compressor section having a compressed gas output linked to the first compressor section for compressing the refrigerant fluid.

The first refrigerant compressor section preferably comprises a first housing or enclosure, a movable member in the housing dividing it into separate first and second chambers, the first chamber being linked to the compressed gas output of the second electrochemical compressor section, and the second chamber containing refrigerant fluid and having an output comprising the refrigerant output for providing compressed refrigerant fluid to the condenser. The movable member may be a diaphragm, piston, bellows or the like, and isolates the refrigerant loop from the compressed gas in the electrochemical compressor section.

The second electrochemical compressor section preferably comprises an electrochemical cell in a third chamber, the third chamber comprising a gas storage chamber on one side of the cell, and the opposite side of the cell having an output connected to the first chamber of the first refrigerant compressor section, the electrochemical cell having a rigidly supported electrolytic membrane and opposing pervious electrodes disposed on each side of the electrolytic membrane and in contact with the membrane, the electrodes defining at least one electrode pair separated by the electrolytic membrane.

The gas is electrochemically reversibly active so as to enter into an anodic reaction at one electrode where the gas molecules are converted to ions transportable through the electrolytic membrane and a cathodic reaction at the opposite electrode where ions are reconverted to gas molecules. Electrical conductors provide an electrical current to the electrode pair for transporting ions through the electrolytic membrane whereby gas is pumped from the third chamber to the output. A plurality of electrode pairs may be disposed on opposite sides of the membrane, with the numbers depending on the required heat loads. Additional electrochemical compressor stations or assemblies may be provided to meet higher heat loads. The gas may be hydrogen or oxygen, for example.

In one embodiment of the invention, the evaporator is suitably attached to a computer processor module to provide the necessary cooling to remove heat from the processor module. The processor can thereby be more efficiently and reliably maintained at the optimum low operating temperature, which will result in higher operating efficiency, better performance, and increased processor lifetime.

According to another aspect of the present invention, a refrigeration method is provided, which comprises the steps of:

connecting an evaporator to a heat load for removing heat from the load;

providing refrigerant fluid to an evaporator inlet whereby heat of evaporation is extracted from the heat load to vaporize the liquid;

connecting vaporized refrigerant from an evaporator output to a first compressor section for compressing the refrigerant;

providing a compressed gas output from a second, electrochemical compressor section to the first compressor section to provide compression energy for compressing the refrigerant; and providing a compressed refrigerant output from the first compressor section to a condenser for condensing the compressed refrigerant, the condensor having an output linked to the evaporator input to provide complete refrigeration cycle.

This invention provides a miniaturized refrigeration system by using an electrochemical cell compressor to provide the necessary compression of the refrigerant, avoiding the need for larger scale, mechanically actuated compressors as have been used in the past. This allows a refrigeration system to be used to remove relatively small, localized heat loads of the order of one kilowatt or less.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
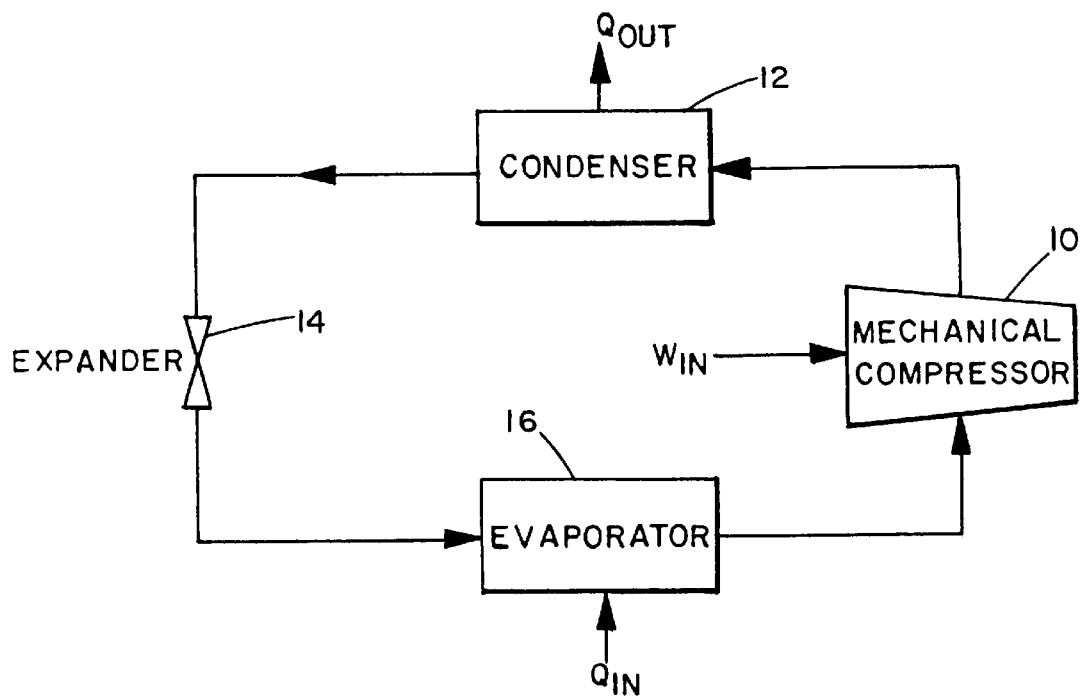
FIG. 1 is a schematic block diagram illustrating the cycle of a prior art vapor compression refrigeration system.

FIG. 1 illustrates the cycle of a prior art vapor compression refrigeration system, based on conventional mechanical compression. As indicated in FIG. 1, a vapor of a refrigerant such as ammonia is compressed in mechanical compressor 10 and allowed to condense in condenser 12, thereby rejecting heat, $Q_{OUT}$. The refrigerant is then expanded in expander 14 and connected to evaporator 16. The liquid refrigerant is vaporized in the coils of evaporator 16 using heat $Q_{IN}$. The vapor is then returned to compressor 10 to complete the cycle. The efficiency of such a refrigeration system is defined by the ratio $Q_{IN}/W_{IN}$. Mechanical compression energy required to compress a vapor is relatively high, so that such a system is only practical where the heat load to be processed is relatively high, making such systems impractical for processing small heat loads.

Figure 2:
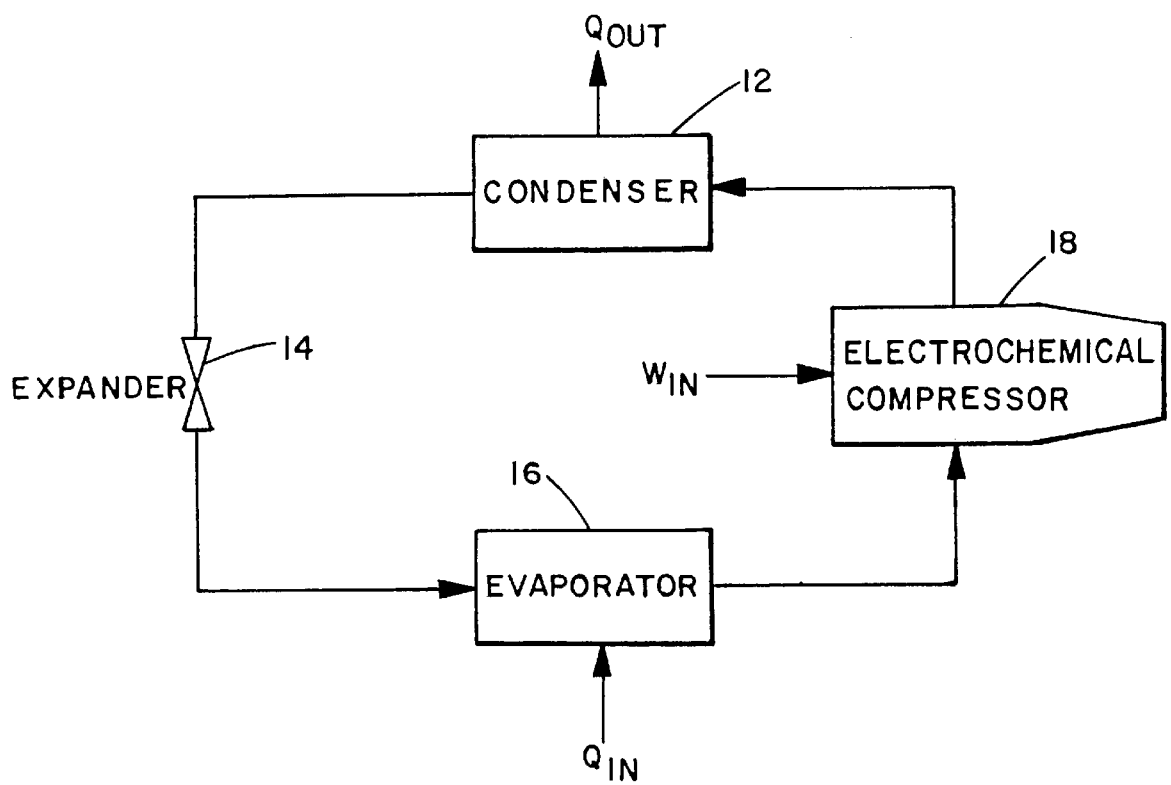
FIG. 2 is a schematic block diagram illustrating the cycle of an electrochemical refrigeration system according to a preferred embodiment of the present invention.

FIG. 2 illustrates the cycle of a refrigeration system according to a preferred embodiment of the present invention, in which the mechanical compressor 10 of FIG. 1 is replaced with an electrochemical compressor 18. The components of the system of FIG. 2 are otherwise the same as that of FIG. 1, and like reference numerals are used as appropriate. The compression energy is reduced when an electrochemical compressor is used, making the system more efficient than that of FIG. 1 for the same quantity of heat to be removed.

Figure 3:
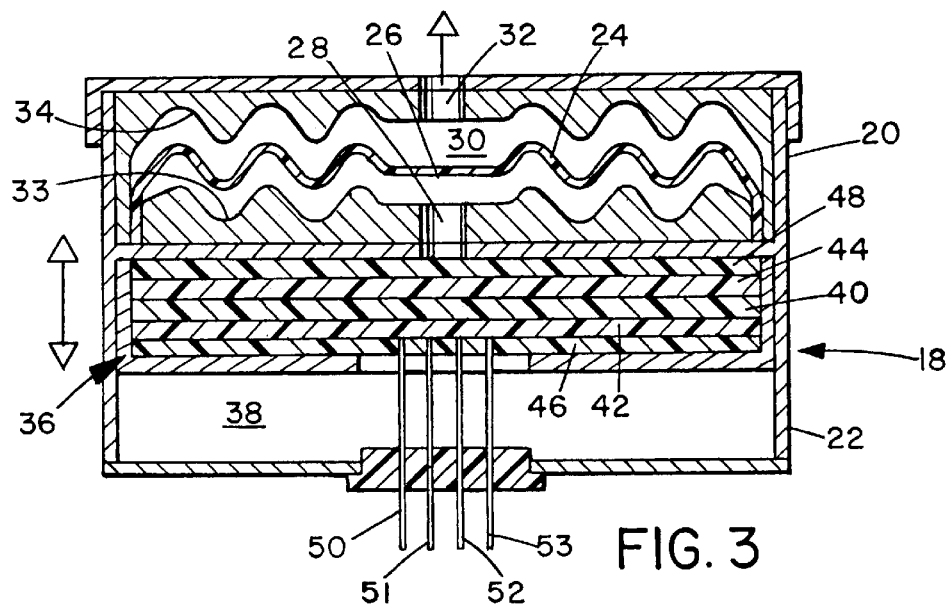
FIG. 3 is a cross-sectional view of the electrochemical compressor of FIG. 2.

FIG. 3 illustrates one possible embodiment of the electrochemical compressor 18 of FIG. 2 in more detail. The compressor 18 comprises a first compressor section or housing 20 for compressing the refrigerant vapor, and a second, electrochemical compressor section 22 linked to section 20 for providing pressurized gas to actuate compressor section 20. The two compressor sections are shown vertically stacked in an integral housing in FIG. 3, but it will be understood that they may alternatively be embodied in two separate housings with a connecting passageway in other embodiments. The electrochemical compressor is similar to the electrochemical pump or motor described in my U.S. Pat. No. 5,149,413, the contents of which are incorporated herein by reference. Electrochemical compressor 18 of the present invention uses electrical power, rather than mechanical power, to compress a gas in a refrigeration system.

The first compressor section 20 forms a cavity which is divided by a flexible diaphragm 24 into a first chamber 26 which is connected to the second, electrochemical compressor section 22 via port 28, and a second chamber 30 having a compressed refrigerant output port 32. Diaphragm stops 33,34 are provided at opposite ends of the cavity. Preferably, the topographical characteristics of the diaphragm are identical with the two diaphragm stops 33,34. Ports 28, 32 are centrally located in the respective diaphragm stops 33,34. It will be understood that the flexible diaphragm may be replaced with any suitable movable member in the compressor cavity, such as a piston or bellows.

The second compressor section also has a cavity in which an electrochemical cell 36 is mounted. A gas storage chamber 38 is provided on one side of cell 36, while the opposite side of the cell communicates with port 28, providing a compressed gas output from the compressor section 22. The electrochemical cell comprises an electrolytic membrane 40 and gas pervious electrodes 42,44 in intimate electrical contact with opposite sides of the membrane. The electrode assembly is compressed between two compression plates 46,48 which have apertures for gas flow through the plates. Plates 46,48 also act as current collectors for the electrochemical cell. The compression plates are sufficiently rigid to withstand pressure differences of up to 10–15 bars, or higher if necessary.

Electrical conductors 50,51,52,53 provide electrical energy to the electrochemical cell and also provide sensor outputs. The electrolytic membrane is a proton conducting membrane such as Nafion®, manufactured by DuPont Corporation of Wilmington, Delaware.

The gas storage chamber contains a gas which is electrochemically active so as to react at the electrodes to produce ions, which will then migrate across the electrolytic membrane 40 and be reconverted to the molecular state on the opposite side of the membrane. One suitable gas is hydrogen. The electrochemical compressor operates according to the following reaction (see U.S. Pat. Nos. 4,402,817, 4,118, 299, and 3,489,670 of Maget):

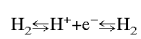

The gas storage chamber stores a volume of hydrogen adequate to supply the hydrogen necessary to compress the refrigerant gas volume under the diaphragm. Under compression, the diaphragm compresses the refrigerant fluid, which may be ammonia, chlorofluorinated compounds, propane, water or any other suitable refrigerant.

The refrigeration fluid is contained within its own condenser, expander, and evaporator loop, as best illustrated in FIG. 2. The expander 14 may be a capillary or frit, or a valve, and the condensor 12 consists of coils or the like. The evaporator 16 is located at the site of the heat to be removed, and may consist of coils, capillaries, or the like. The refrigerant compression process in this system is passive, i.e. it does not require mechanical motion machinery, and can be conducted at high pressures (in excess of 100 bars, or 1500 p.s.i.), which for mechanical compressors would require multi-stage, complex equipment.

Figure 4:
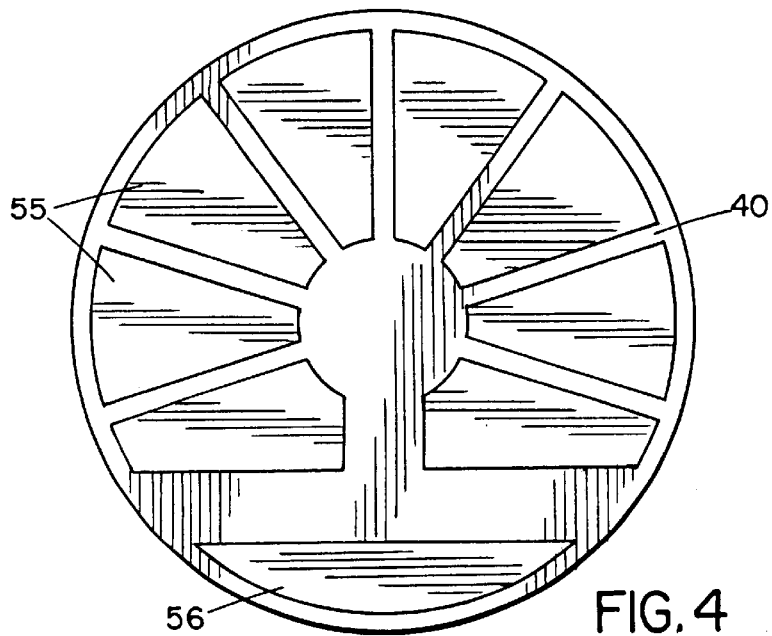
FIG. 4 illustrates one possible embodiment of the pervious electrode pattern used on both surfaces of the electrolytic membrane of FIG. 3.

The electrochemical cell may have one electrode pair, with one electrode of the pair on each side of the membrane. However, multiple electrode pairs are preferably provided in order to meet the required heat load. FIG. 4 illustrates one possible configuration of eight multi-junction hydrogen transfer electrochemical cells assembled on a single proton-conducting membrane 40. FIG. 4 illustrates the electrodes 55 applied on one side of membrane 40, and corresponding electrodes (not illustrated) will be positioned on the opposite side of the membrane. The electrodes are series connected. One of the electrodes 56 is electrically isolated from the other, multi-junction electrodes 55 and comprises an electrochemical pressure sensor (see U.S. Pat. No. 5,149,413 referred to above, as well as my U.S. Pat. Nos. 5,334,304 and 5,417,822). The "pressure ratio" sensor, which is preferably an integral part of the electrochemical cell as illustrated in FIG. 4, can be used to control the displacement of the diaphragm. Alternatively, a conventional pressure sensor or an internal contact switch may be used.

Due to the high efficiency of the electrochemical process, each cell in FIG. 4 operates at a low voltage, generally below 0.1 volt. In order to achieve a hydrogen generation rate requiring N amps, the eight series-connected cells require a total voltage of 0.8 volts (0.1×8) and the cell current is reduced to N/8 amps. The electrode pairs may also be connected via parallel connections or series/parallel combinations. If a high hydrogen generation rate is required, the size of the assembly or number of cells can be increased, or multiple cell assemblies may be stacked. Since each cell assembly, including current collectors and compression plates, has a thickness of less than 2.5 mm., multi-cell stacks will still not take up much space.

The electrochemical cell generates hydrogen, which is provided to the chamber 26 via port or outlet 28. This in turn moves the diaphragm 24 in order to compress the refrigerant vapor in chamber 30, providing the energy necessary to operate the refrigeration cycle of FIG. 2. The hydrogen in the electrochemical compressor section 22 is isolated from the refrigerant loop of FIG. 2 via the diaphragm 24, which transfers the hydrogen compression energy to the refrigerant loop. A bellows or piston may be used in place of diaphragm 24 in alternative embodiments. The decompression cycle is achieved in a known manner by reversing the polarity of the current to the electrodes or by using a "dump" valve, as described in my U.S. Pat. No. 5,038,821.

Figure 5:
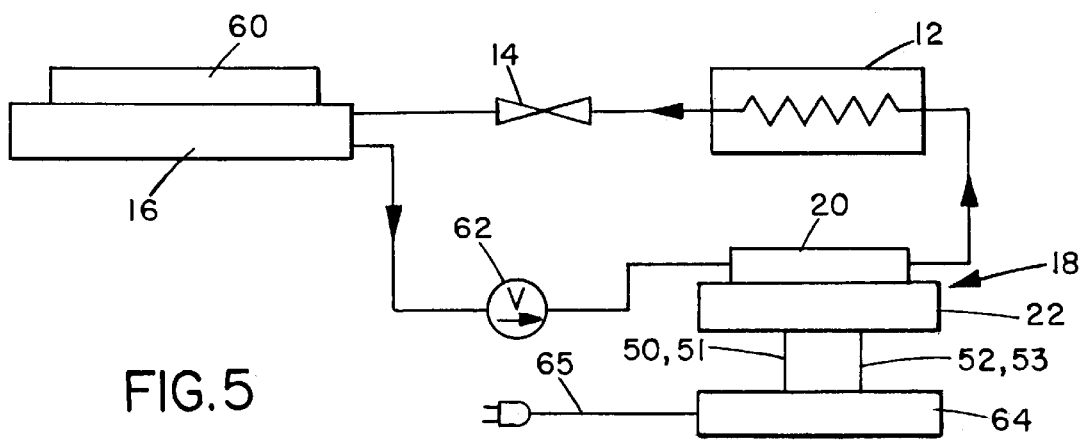
FIG. 5 is a schematic block diagram illustrating one possible application of the electrochemical refrigeration system of FIGS. 2 and 3.

FIG. 5 illustrates one possible application of an electrochemical refrigeration system as described above in connection with FIGS. 2 to 4. Removal of small heat loads is required in computer processing equipment such as the Intel Pentium® or AMD's (American Micro Devices) Athlon®. Heat loads of 5 to 35 watts are generated at sites with surface areas of 5 cm. by 5 cm. in confined regions of the processor or computer boards.

As illustrated in FIG. 5, a processor module 60 is physically attached or bonded to a thermal transfer plate, into or onto which the coils of evaporator 16 are located to effectively remove heat from the transfer plate, which can reach temperatures of 86° C., using conventional forced flow cooling techniques. Evaporator 16 is connected in a refrigerant closed loop consisting of the refrigerant compressor section 20, condensor/heat exchanger 12, expander 14, evaporator 16, and a one-way valve 62. The low pressure vapor from evaporator 16 is returned to the refrigerant compressor section 20 of compressor 18. One way valve 62 prevents compressed refrigerant vapor from entering the low pressure part of the loop.

As noted above, each electrochemical cell assembly is less than 2.5 mm. in thickness. Thus, multi-cell stacks may be readily positioned in the electronic case of a processor unit, for example between adjacent processor boards, which are typically placed between 1.5 cm. to 2.0 cm. apart, or in any other convenient location inside or outside the electronic case. A processor such as a Pentium® may have hot spots at temperatures of around 100° C. The microrefrigeration system of this invention can reduce such temperatures to 20–25° C.

The hydrogen compressor 22 is controlled via a power conditioning/control unit 64, including a microprocessor for controlling the compressor and refrigeration cycle. A line power input 65 is provided to the unit 64, where it is converted to DC at voltage levels of 3,5, or higher volts as required. DC power is supplied via wires 50,51 to the electrode pairs. Processor sensor signals (temperature and pressure) are supplied via wires 52,53 to control motion of the compressor diaphragm 24 of FIG. 3.

Although the electrochemical refrigeration system of this invention is particularly suitable for providing cooling of the small heat loads typically generated by computer processors, it may alternatively be used in other applications where removal of a small heat load is required, such as other types of electrical or electronic equipment.

Some specific examples of an electrochemical refrigeration system as illustrated in FIGS. 2 to 5 are provided below.

EXAMPLE I

A refrigeration unit, using ammonia as a refrigerant, with a condenser temperature of 85–105° F., and a pressure of 153–218 psi (11–15 atm) is used to maintain a heat source at the sub-ambient temperature of 2° C. (35° F.), at the evaporator pressure of 3.7 atm. For this application the required compression ratio will be from 3 to 4. To satisfy these requirements, the following electrochemical compressor characteristics are obtained:

SPECIFIC CHARACTERISTICS/WATT of heat

| | | |
|---|---|---|
| Ammonia flow rate, cc/sec at 3.7 atm | 0.25 | |
| Theoretical cell current, amps | 8.0 | |
| Selected cell areas, cm$^2$ | 8.0 | 16.0 |
| Current density, A/cm$^2$ | 1.00 | 0.50 |
| Cell resistance, ohm-cm$^2$ | 0.22 | 0.22 |
| Single cell voltage, volts | 0.22 | 0.11 |

COMPRESSOR REQUIREMENTS FOR DIFFERENT HEAT LOADS

| | | |
|---|---|---|
| Heat load, watts | 10 | |
| Theoretical current, amps | 80 | |
| # cells/assembly | 5 | |
| # of assemblies | 8 | |
| Single cell area, cm$^2$ | 8.0 | 16.0 |
| Assembly area, cm$^2$ | 40.0 | 80.0 |
| Fractional area utilization | 0.85 | 0.85 |
| Actual area, cm$^2$ | 47.0 | 94.0 |

-continued

| | | |
|---|---|---|
| Assembly diameter, cm | 7.7 | 10.9 |
| height, cm | 2.5 | 2.5 |
| Compressor current, amps | 2.0 | 2.0 |
| voltage, volts | 2.2 | 1.1 |
| power, watts | 4.4 | 2.2 |
| Ratio watts in/watts out | 0.44 | 0.22 |

To meet higher heat loads, such as 35 watts, a stack of twenty eight assemblies from 5.5 to 7.7 cm in diameter and height of 7 cm would be adequate. If the processor has a height constraint of less than 1.5 cm, the compressor diameter can be increased while decreasing its height.

Since the stroke volume is 0.25 cc/sec, the compressor frequency can be one pulse/second, or at a higher frequency for reduced single stroke volumes.

EXAMPLE II

A refrigeration unit utilizing water as a refrigerant with a condenser temperature of 85° F. and subatmospheric pressure of 32 mmHg is used to maintain a heat source at subambient temperature of 2° C. (35° F.) at the evaporator pressure of 1.5 mmHg. For this application, the required compression ratio will be 21 to 1. To satisfy these requirements, the following electrochemical compressor characteristics are obtained:

SPECIFIC CHARACTERISTICS/WATT of heat

| | |
|---|---|
| Water flow rate, cc/sec. (NTP) | 0.57 |
| Theoretical current, amps | 4.90 |
| Selected area, cm$^2$ | 20.0 |
| Current density, A/cm$^2$ | 0.245 |
| Single cell voltage, volts | 0.054 |

COMPRESSOR REQUIREMENTS FOR A HEAT LOAD OF 10 Watts

| | |
|---|---|
| Theoretical current, amps | 49.0 |
| # cells/assembly | 3.0 |
| # of assemblies | 6.0 |
| Cell area, cm$^2$/assembly | 60.0 |
| Area utilization, % | 85.0 |
| Actual area, cm$^2$ | 70.6 |
| Assembly diameter, cm | 9.5 |
| height, cm | 0.25 |
| Stack height, cm | 1.8 |
| Compressor current, amps | 2.7 |
| voltage, volts | 1.0 |
| power, watts | 2.7 |
| Ratio watts in/watts out | 0.27 |

To meet higher heat loads, it would suffice to add assemblies without changing the compressor area; the compressor current would be unchanged, the voltage would increase accordingly.

It should be apparent from the previous descriptions and examples that an electrochemical hydrogen compressor can be selected for various cooling or refrigeration applications and that by selecting appropriate operating conditions, sizes, geometries, refrigerants or thermodynamic cycles, it can satisfy many practical requirements.

Although a preferred embodiment of the invention has been described above by way of example only, it will be understood by those skilled in the field that modifications may be made to the disclosed embodiment without departing from the scope of the invention, which is defined by the appended claims.

I claim:

1. A refrigeration system, comprising:
   an evaporator having an input for refrigerant fluid and an output for expanded refrigerant fluid, and adapted for removing heat from a heat load of less than one kilowatt;
   a compressor having a refrigerant input connected to the evaporator output and a refrigerant output for compressed refrigerant fluid;
   a condensor for condensing the compressed refrigerant fluid, the condensor having an input connected to the compressor refrigerant output and an output linked to the evaporator input;
   the compressor having a first refrigerant compressor section connected to said refrigerant input for providing compressed refrigerant fluid at the refrigerant output, and a second electrochemical gas compressor section having a gas output linked to the first compressor section for compressing the refrigerant fluid; and
   the first refrigerant compressor section comprises a first housing, an impermeable movable member in said housing dividing the housing into separate first and second chambers, the first chamber being linked to the compressed gas output of the second electrochemical compressor section, and the second chamber containing refrigerant fluid and having an input comprising said refrigerant input and an output comprising said refrigerant output for providing compressed refrigerant fluid to said condensor.

2. The system as claimed in claim 1, wherein the movable member comprises a diaphragm.

3. The system as claimed in claim 1, wherein the movable member comprises a piston.

4. The system as claimed in claim 1, wherein the movable member comprises a bellows.

5. The system as claimed in claim 1, wherein the second electrochemical compressor section comprises a third chamber, an electrochemical cell in the third chamber having opposite sides and defining a gas storage cavity in said third chamber on one side of the cell, the opposite side of the cell being connected to the compressed gas output, the electrochemical cell having a rigidly supported electrolytic membrane and opposing pervious electrodes disposed on each side of said electrolytic membrane and in contact with said membrane defining at least one electrode pair separated by said electrolytic membrane;
   said gas being electrochemically reversibly active so as to enter into a reduction/oxidation reaction at said electrodes and produce ions transportable through said electrolytic membrane; and
   electrical conductors for providing a reversible electrical current to said electrode pair for transporting said ions through said electrolytic membrane whereby said gas is pumped reversibly from said gas storage cavity to said compressed gas outlet on the opposite side of said cell, the polarity of said current being reversible to selectively reverse the direction of ion transportation through said membrane.

6. The system as claimed in claim 5, wherein a plurality of electrode pairs are disposed on opposite sides of said membrane.

7. The system as claimed in claim 5, wherein the gas in the electrochemical compressor section is hydrogen.

8. The system as claimed in claim 5, wherein the gas in the electrochemical compressor section is oxygen.

9. A refrigeration method, comprising the steps of:

connecting an evaporator to a heat load for removing heat from the load;

providing refrigerant liquid to an evaporator inlet whereby heat of evaporation is extracted from the heat load to vaporize the liquid;

connecting vaporized refrigerant from an evaporator output to a first chamber of a compressor which is isolated from a second chamber of the compressor by an impermeable movable member for compressing the refrigerant;

providing a gas output from a second, electrochemical compressor section to the second chamber of the compressor to provide compression energy for compressing the refrigerant; and providing a compressed refrigerant output from the first compressor chamber to a condensor for condensing the compressed refrigerant, the condenser having an output linked to the evaporator input to provide complete refrigeration cycle.

10. A refrigeration system, comprising:

an evaporator having an input and an output;

a compressor having a refrigerant input connected to the evaporator output and a refrigerant output;

a condenser having an input connected to the refrigerant output of the compressor and an output linked to the evaporator input;

the evaporator, compressor and condensor together providing a refrigeration cycle for removing a heat load;

a working refrigerant fluid circulating in the refrigeration cycle through the evaporator, compressor and condensor, the refrigerant fluid being of a non-electrochemically active material; and the compressor having a first compressor chamber connected to said refrigerant input and output, a second compressor chamber, an impermeable, movable member between the first and second compressor chambers for compressing the refrigerant fluid in said first chamber, and an electrochemical compressor connected to said second compressor chamber to provide a supply of electrochemically active gas to said second compressor chamber in order to move said movable member and compress said refrigerant fluid.

11. The system as claimed in claim 10, wherein the electrochemical compressor comprises a sealed container containing an electrochemically active gas and an electrochemical cell in said container dividing said container into two separate cavities on opposite sides of said cell, one of said cavities communicating with said movable member, said electrochemical cell including an electrolytic membrane and a power supply connected to said membrane for providing a reversible electric reaction whereby gas ions are pumped from one side of the membrane to the other side of the membrane.

* * * * *